US 7,451,279 B2

(12) United States Patent
Nakatani et al.

(10) Patent No.: US 7,451,279 B2
(45) Date of Patent: Nov. 11, 2008

(54) STORAGE SYSTEM COMPRISING A SHARED MEMORY TO ACCESS EXCLUSIVELY MANAGED DATA

(75) Inventors: Yoji Nakatani, Yamato (JP); Koji Sonoda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 158 days.

(21) Appl. No.: 11/009,812

(22) Filed: Dec. 9, 2004

(65) Prior Publication Data

US 2006/0090042 A1     Apr. 27, 2006

(30) Foreign Application Priority Data

Oct. 22, 2004 (JP) .............................. 2004-308017

(51) Int. Cl.
*G06F 12/00* (2006.01)
(52) U.S. Cl. ...................... 711/147; 711/100; 711/130; 711/154; 707/1; 709/213; 709/215; 709/219
(58) Field of Classification Search ............... 711/147
See application file for complete search history.

(56) References Cited

U.S. PATENT DOCUMENTS

| | | | | |
|---|---|---|---|---|
| 4,382,287 A * | 5/1983 | Ackman et al. | ............. | 709/248 |
| 5,452,447 A * | 9/1995 | Nelson et al. | ............... | 707/205 |
| 5,519,831 A * | 5/1996 | Holzhammer | ................ | 714/22 |
| 6,108,684 A * | 8/2000 | DeKoning et al. | .......... | 718/105 |
| 6,247,099 B1 * | 6/2001 | Skazinski et al. | ........... | 711/141 |
| 6,321,298 B1 * | 11/2001 | Hubis | .......................... | 711/124 |
| 6,381,674 B2 * | 4/2002 | DeKoning et al. | .......... | 711/113 |
| 6,453,354 B1 * | 9/2002 | Jiang et al. | ................... | 709/229 |
| 6,671,773 B2 | 12/2003 | Kazar et al. | | |
| 6,718,375 B1 * | 4/2004 | Hornung et al. | ............. | 709/223 |
| 2001/0047448 A1 * | 11/2001 | Sueoka et al. | .................. | 711/4 |
| 2002/0016792 A1 * | 2/2002 | Ito et al. | ...................... | 707/200 |
| 2003/0188045 A1 * | 10/2003 | Jacobson | ........................ | 710/1 |
| 2003/0204683 A1 * | 10/2003 | Okumoto et al. | ............ | 711/147 |

OTHER PUBLICATIONS

Microsoft Delivers Multipath I/O Support for Storage Devices, Sep. 5, 2002, Microsoft.*
Peglar, Rob. The next evolution in storage: clustered storage architectures—Storage Management, Sep. 2003, Computer Technology Review.*

(Continued)

*Primary Examiner*—Kevin L Ellis
*Assistant Examiner*—Kalpit Parikh
(74) *Attorney, Agent, or Firm*—Townsend and Townsend and Crew LLP (57) ABSTRACT

A storage system includes a storage device, a shared memory, and first and second file server devices that each exclusively manages a respective portion of data stored on the storage device. During operation, the first file server device determines whether the first or second file server device manages data that is subject to the processing of a write command received by the first file server device. When the second file server device manages data that is subject to the processing of the write command, the first file server device transfers only the control data contained in the write command to the second file server device and updates data that is subject to the processing of the write command via the shared memory.

12 Claims, 7 Drawing Sheets

OTHER PUBLICATIONS

Thekkath et al., "Separating Data and Control Transfer in Distributed Operating Systems", 1994, ACM, p. 3. http://www.cs.berkeley.edu/~brewer/cs294/TLL944.ps.*

Greg Schulz, "Whats so great about block-level access", Sep. 2004, Search Storage, p. 1. http://searchstorage.techtarget.com/ateQuestionNResponse/0,289625,sid5_cid607313_tax297597,00.html.*

* cited by examiner

Fig.3(a)
Request command

Format

| Command type | File handle | Command length | Parameters |

When reading

| Read | File handle | Command length | Offset | Data size |

When writing

| Write | File handle | Command length | Offset | Data size | User data |

Fig.3(b)
Response command

Format

| Status | Command length | Parameters |

When reading

| OK/NG | Command length | Attributes | Data size | User data |

When writing

| OK/NG | Command length | Data size |

Fig.4

File System Control Table

| GFS-ID | S-ID | LFS-ID |
|--------|------|--------|
| gfs00 | s1 | FS1 |
| gfs01 | s1 | FS2 |
| gfs02 | s2 | FS6 |
| gfs03 | s2 | FS8 |
| ⋮ | ⋮ | ⋮ |

File System List (Server 1)

| | GFS-ID | S-ID | LFS-ID | Mount point | Attributes |
|---|--------|------|--------|-------------|------------|
| ☐ | gfs00 | s1 | FS01 | /mnt/fs00 | rw |
| ☐ | gfs01 | s1 | FS02 | /mnt/fs01 | rw |
| ☑ | gfs02 | s2 | FS06 | /mnt/fs02 | ro |
| ☐ | gfs03 | s3 | FS05 | /mnt/fs03 | rw |

Edit  Create  Erase

STORAGE SYSTEM COMPRISING A SHARED MEMORY TO ACCESS EXCLUSIVELY MANAGED DATA

CLAIM OF PRIORITY

The present application claims priority from Japanese application P2004-308017 filed on Oct. 22, 2004, the content of which is hereby incorporated by reference into this application.

BACKGROUND

The present invention relates to a storage system which is connected to a client and that stores the data that this client uses.

In recent years, storage systems called NAS (Network Attached Storage) that store data transferred from a client via a network have become widespread. An NAS consists mainly of a server device and a disk device. The server device receives commands relating to input and output of data from the client, and controls reading and writing of data to the disk device according to this command.

In recent years, as the performance of clients increases, the size of data handled by the clients has increased. Because of that, there is a desire for an increase in storage capacity for storage systems, as well as a desire for increased data input and output speed. Generally, to increase the input/output speed of data for a storage system, it is necessary, for example, to replace the server device CPU with a high performance item, or to increase the capacity of the built in memory, etc. However, since there is a limit to the types of CPU and memory capacity that can be incorporated into a server device, in recent years, there has been proposed technology that attempts to increase the performance of the overall system by increasing the number of server devices themselves.

In this way, as a storage system comprising a plurality of server devices, disclosed in U.S. Pat. No. 6,671,773 is the structure of a storage system for which a plurality of server devices called network elements are connected to a plurality of disk devices via a switching device.

SUMMARY

However, for prior art storage systems comprising a plurality of server devices, in cases such as when a certain server device transfers a command received from a client to another server device suited for that command process, it was necessary to transfer the entire command including user data that performs write to the disk device. Because of this, when the user data size is large, the load on the CPU of the server device that performs data transfer increases, so there was the risk that a delay would occur in the response to the client. This kind of problem was a problem common to all storage systems that comprise a plurality of server devices, not just to the NAS.

The present invention was created to solve the problems that occur with transfer of commands between server devices in this way, and its purpose is further to improve the overall performance of storage systems.

Considering the purpose noted above, the storage system of the present invention is a storage system that is connected with a client, comprising:

a storage device that stores data used by the client;

a plurality of server devices that each exclusively manages at least part of the data stored in the storage device; and a shared memory that is used in common by each of the server devices, wherein the server devices comprise:

a determination unit that, when a command relating to data input and output is received from the client, determines the server device that manages the data that is subject to the processing of the command; and a data processing unit that, when the server device that was determined by the determination unit is a server device other than itself, transfers control data contained in the command to the determined server device, and when data specified by the control data is read from the storage device and transferred to the shared memory by the server device that received the transfer of the control data, processes the data transferred to the shared memory according to the command.

For the server devices that form the storage system of the present invention, when the data that is subject to the processing of commands received from a client is judged to be data that is managed by another server device, rather than the entire command, only the control data part that is contained in the command is transferred to that server device. Because of this, there is a decrease in the volume of data that is exchanged between server devices, which suppresses the delay in response to the client, and allows an increase in the overall storage system processing performance.

For a storage system with the structure noted above, it is also possible to have the server device further comprise a shared memory transfer unit that, when the control data transfer is received by a server device other than the device itself that performed the determination of the server device by the determination unit, reads the data specified by the control data from the storage device and transfers this to the shared memory.

With this kind of structure, all of the server devices that form the storage system are able to receive transfer of control data from other server devices.

For the storage system of the structure noted above, it is possible for the data processing unit of the server device to comprise an update processing unit that, when the command is a command relating to data writing, updates data transferred to the shared memory by the user data contained in the command. In this case, it is possible for the server device to further comprise a write processing unit that, when the data transferred to the shared memory is updated by the server device that sent the control data, writes the updated data back to the storage device.

With this kind of structure, it is possible to write the user data contained in the command to a storage device via shared memory, without directly sending and receiving between server devices. Because of this, it is possible to lighten the processing load on each server device.

For the storage system of the structure noted above, it is possible to have the data processing unit of the server device comprise a read processing unit that, when the command is a command relating to data reading, outputs the data transferred to the shared memory to the client.

With this kind of structure, it is possible to output the data read from the storage device to a client via shared memory, without directly sending and receiving between server devices. Because of this, it is possible to lighten the processing load on each server device.

For the storage system of the structure noted above, it is possible to have the determination unit of the server devices determine the server device that manages data that is subject to the processing of the command based on the management table in which is defined the correlation between each of the server devices and the file system within the storage device that is uniquely managed by each of the server devices.

With this kind of structure, it is possible to easily determine the server device for which control data is to be transferred by using a management table.

For the storage system of the structure noted above, it is possible to further comprise a management device for performing setting of the management tables for each of the server devices.

With this kind of structure, it is possible to flexibly set for each server device the file system for which access to the client is allowed For the storage system of the structure noted above, it is also possible to have the server devices have a memory map that is mapped by an address system for which the address of the storage area within the local memory the server device comprises and the address of the storage area within the shared memory are in common, and to comprise a means of accessing the shared memory using that memory map.

With this kind of structure, it is possible for the server device to easily access shared memory by the same method as accessing its own local memory.

For the storage system of the structure noted above, it is also possible to have the shared memory be non-volatile memory for which the power supply is backed up.

With this kind of structure, even in cases when power is cut off due to a power outage, etc., it is possible to suppress loss of data stored in the shared memory.

Note that the storage system noted above comprises the shared memory as respective shared memory areas within the local memory of each of the server devices, and it is possible for each of the server devices to have a memory map that maps the shared memory area of a mutually different server device. With this kind of structure, it is possible to simplify the hardware structure.

The present invention may also be constructed as the following kind of server device. Specifically, the server device is configured part of a storage system that comprises a shared memory used in common with a plural of server devices and exclusively manages at least part of data stored in a storage device together with another server device, said server device comprising:

a determination unit that, when a command related to input and output of data is received from a client, determines a server device that manages the data that is subject to the processing of the command by analyzing the contents of the command; and a data processing unit that, when said server device that was determined by said determination unit is a server device other than itself, transfers control data included in the command to said determined server device, and when data specified by the control data is read from said storage device and transferred to said shared memory by said server device that received the transfer of the control data, processes the data transferred to said shared memory according to the command.

With a server device of this kind of structure as well, there is a decrease in the volume of data that is exchanged between server devices, so it is possible to inhibit delay in responses to the client, and to improve the processing capability of the overall storage system.

Also, for the present invention, in addition to the structure as the storage system and server device described above, it is also possible to use as the structure, for example, a method of data processing that performs data input and output using memory that is shared by a server device with other server devices, or a computer program product for controlling data input and output. This computer program may be realized within a carrier wave as a data signal, or may be recorded on a recording medium that can be read by a computer. As a recording medium, it is possible to use, for example, a CD-ROM, flexible disk, photo magnetic disk, or DVD, etc.

DESCRIPTION OF THE PREFERRED EMBODIMENTS

To further clarify the merits and effects of the present invention, we will explain in the following order embodiments of the present invention based on working examples.

Figure 1:
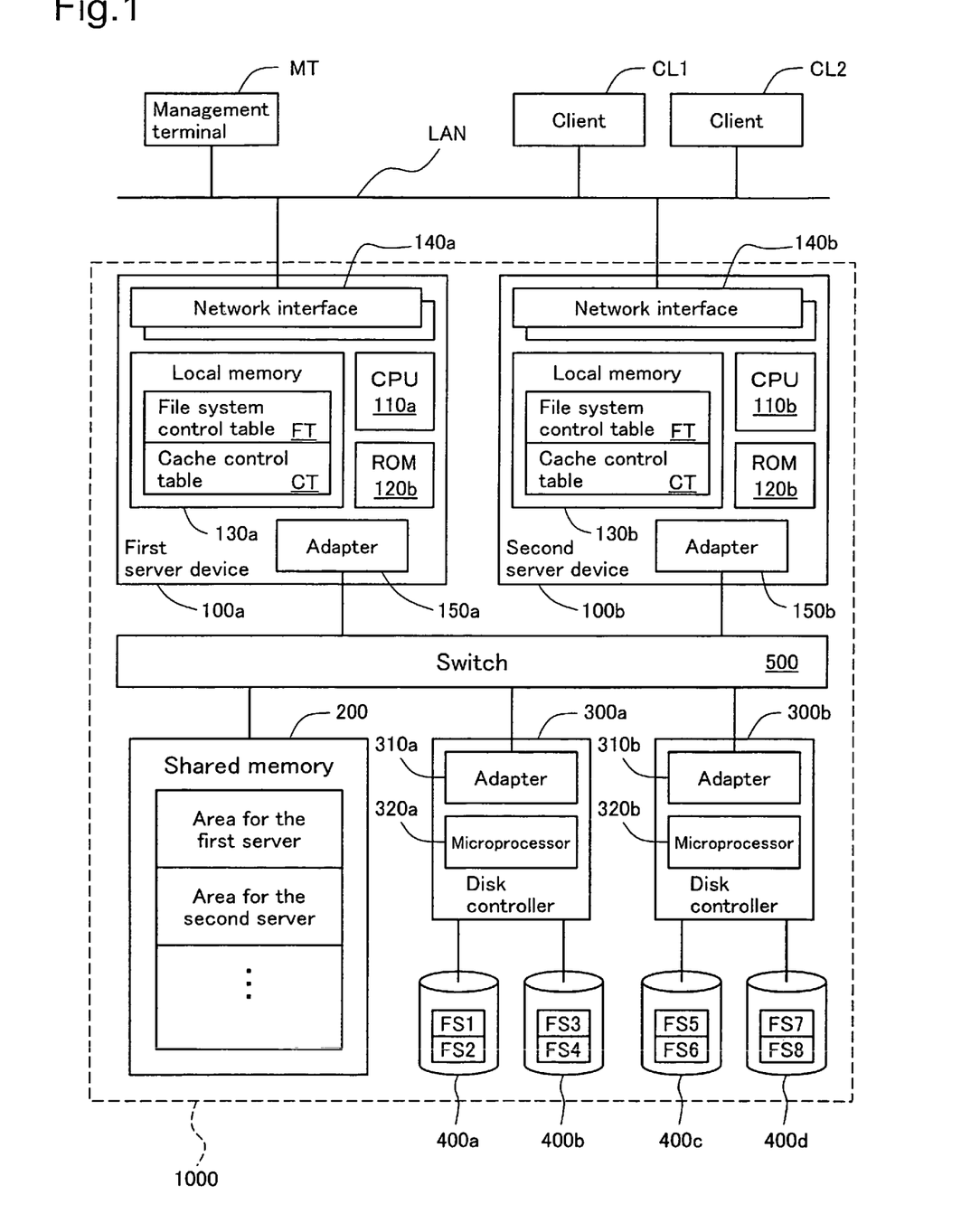
FIG. 1 is an explanatory diagram that shows the hardware structure of the storage system 1000.

A. Memory System Structure:

B. File Access Processing:

A. Memory System Structure:

FIG. 1 is an explanatory diagram that shows the hardware structure of the storage system 1000 as a working example. The storage system 1000 is a system that is used as a file server for storing the various data used by the clients CL1 and CL2 connected via a LAN.

The storage system 1000 of this working example comprises a first server device 100*a*, a second server device 100*b*, a shared memory 200, a data controller 300*a* to which are connected the disk devices 400*a* and 400*b*, and a disk controller 300*b* to which are connected the disk devices 400*c* and 400*d*, and these are respectively connected via a switch 500. Note that here we had the connection made via the switch 500, but it is also possible to connect via a bus or network. Note that there may be any number of server devices, disk controllers, or disk devices, and it is also possible to equip a higher number of these.

The first server device 100*a* and the second server device 100*b* each exclusively manage the file systems stored in the disk devices 400*a* to 400*d*. For example, it is possible to have the first server device 100*a* manage the file systems FS1 to FS3 noted in the figure, and to have the second server 100*b* manage the remaining file systems FS4 to FS8. Note that each of the server devices 100 may also be made to exclusively manage the entire file system, or be made to manage that part overlapping.

Each of the server devices 100 of this working example includes a file system managed by the other server device 100, and understands the location of all of the file systems held within the storage system 1000. Because of this, it is possible to receive from the client CL access not only to the file system managed by itself, but also the file system managed by the other server device 100. For example, when the first server device 100*a* receives from the client CL1 a command to write data to the file system FS7 managed by the second server device 100b, the first server device 100a directly transfers the control data part in that command to the second server device 100b via the switch 500, and for the user data part contained in the command, holds this once within its own local memory 130a. The second server device 100b that receives control data from the first server device 100a notifies the first server device 100a of the cache position within the shared memory 200. The first server device 100a writes the user data that was held within the local memory 130a to the notified cache position within the shared memory 200. The second server device 100b performs the process of writing the user data written to shared memory by the first server device 100a to the file system FS7 it manages itself. By performing this kind of process, each of the server devices 100 is able to receive access to the file system managed by the other server device 100.

Next, we will give a brief explanation of the hardware structure of each device that forms the storage system 1000. Note that for convenience of explanation, when it is not necessary to determine the server devices or disk controllers individually, we will omit part of the code number (the code ending a or b, for example) in the explanation.

The first server device 100a and the second server device 100b each comprise a CPU 110, a ROM 120, a local memory 130, a network interface 140 for connecting to a LAN, and an adapter 150 for connecting to a switch 500.

Stored in the ROM 120 is a control program for controlling the operation of the server device 100. By executing this control program, the CPU 110 functions as a determination unit, a data processing unit, a shared memory transfer unit, an update processing unit, a write processing unit, and a read processing unit.

The local memory 130 is used as a work area when the CPU 110 executes the control program described above. Also, stored in the local memory 130 is a file system control table FT for comprehensively managing the file system that is managed by itself or another server device 100 or a cache control table CT that manages the data within the shared memory 200. The details of these tables will be described later.

The disk controllers 300a and 300b each comprise an adapter 310a and 310b for connecting to the switch 500 and a microprocessor 320a and 320b. The microprocessors 320a and 320b control reading and writing of data to the magnetic disks 400a to 400b connected to these disk controllers 300a and 300b according to instructions from the first server device 100a and the second server device 100b.

The shared memory 200 is memory that is used as cache memory by each of the server devices 100. For the internal storage area, the usable areas are segmented for each of the server devices. For example, the first server device 100a uses the area shown as "the area for the first server" within the shared memory 200 shown in FIG. 1. This shared memory 200 is formed by non-volatile memory for which the storage contents are backed up by a battery. Because of this, even when there is a cutoff in power such as due to a power outage, the storage contents are kept, and it is possible to suppress loss of cached data.

Figure 2:
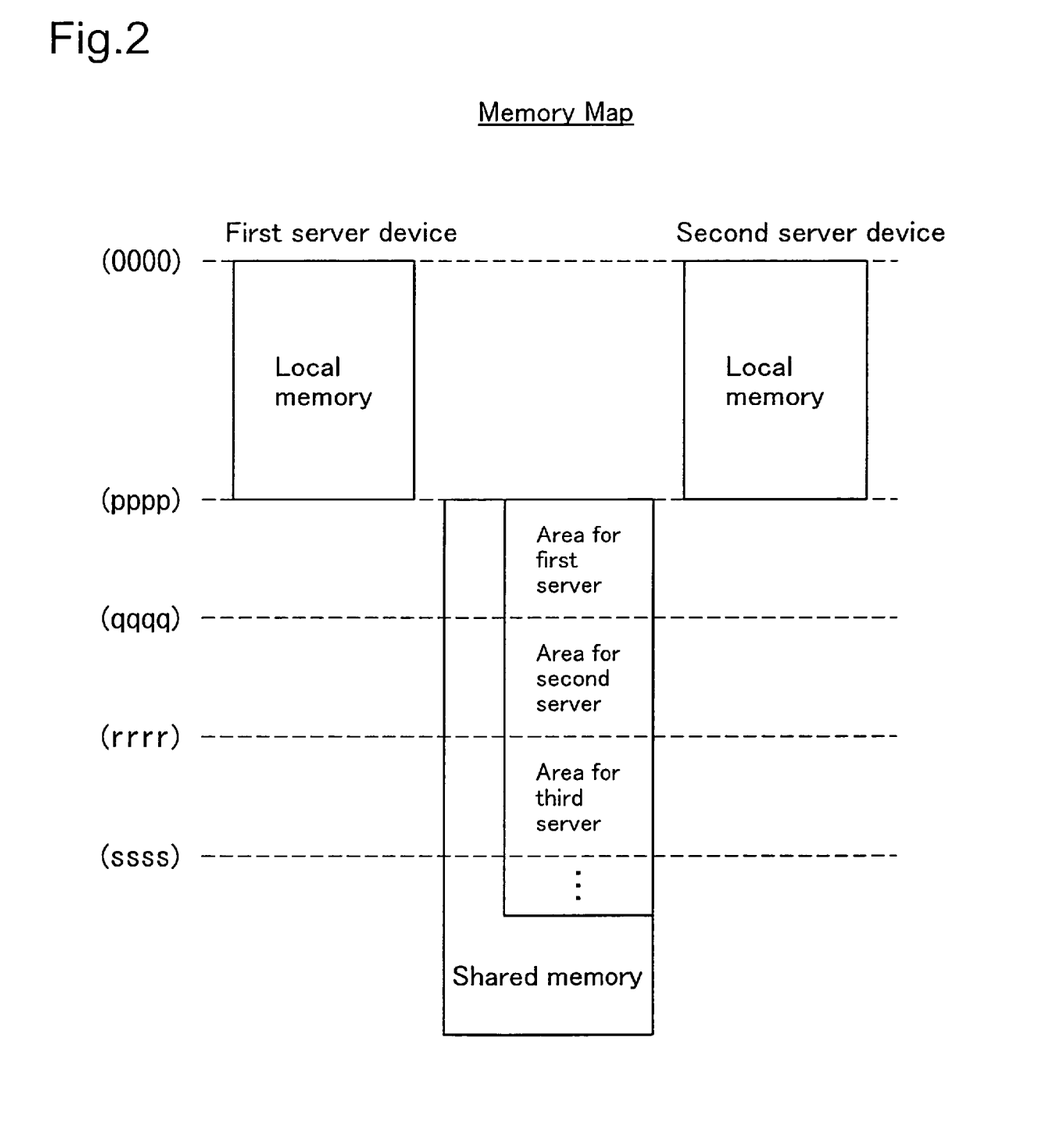
FIG. 2 is an explanatory diagram that shows a typical representation of a memory map.

FIG. 2 is an explanatory diagram that shows a typical image of a memory map used when each of the server devices 100 accesses its own local memory 130 or shared memory 200. In this memory map, the area within the local memory 130 and the area within the shared memory 200 that each of the server devices comprises are consecutively mapped by a common address system. By using this memory map, each of the server devices 100 is able to access the shared memory 200 using the same method as the access method for its own local memory 130.

Figure 3A:
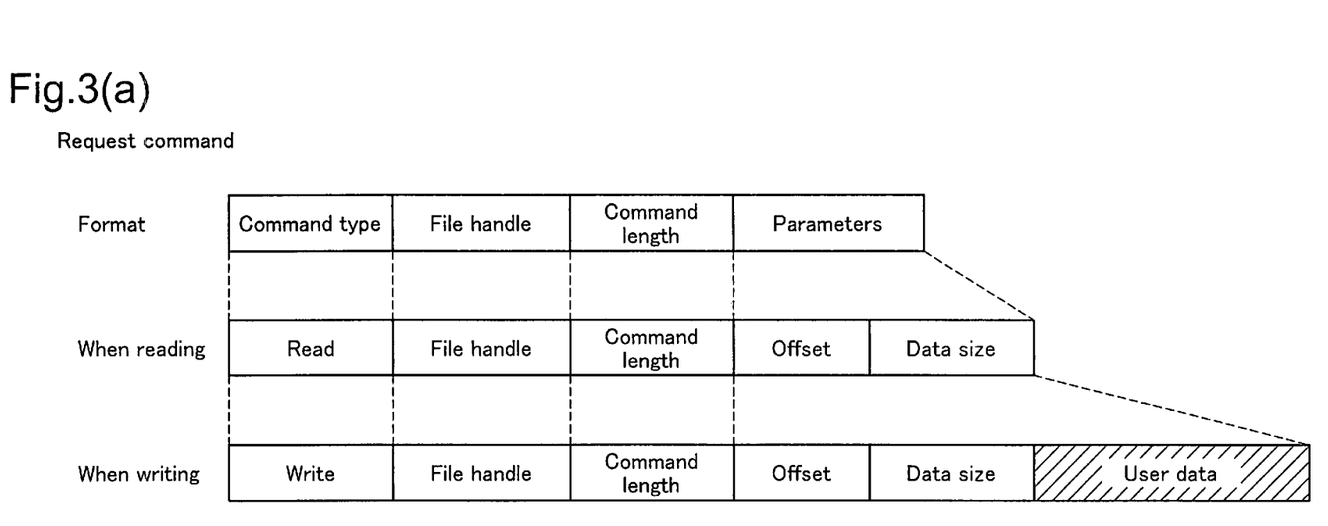
FIG. 3 is an explanatory diagram that shows the data structure of a command.
Figure 3B:
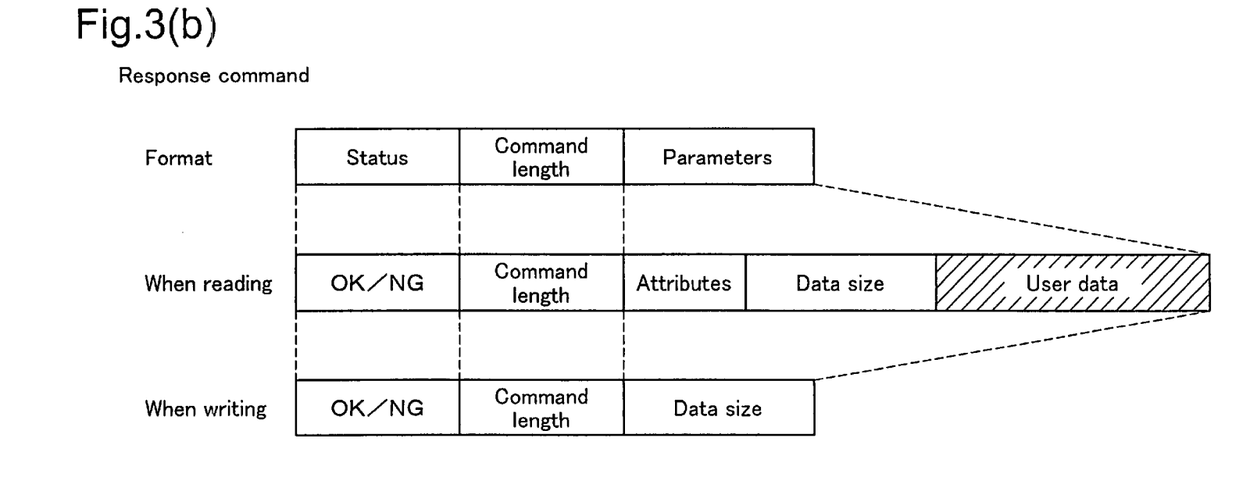

FIG. 3 is an explanatory diagram that shows the data structure of the commands that are sent and received between the client CL and the server device 100. FIG. 3(a) shows the data structure of the request commands that are received from the client CL by the server device 100, and FIG. 3(b) shows the data structure of the response commands that are returned to the client CL by the server device 100. The parts shown by cross hatching in the command shown in the figure shows the user data that is subject to reading and writing to the disk device 400, and the other parts show the control data for controlling this reading and writing.

As shown in FIG. 3(a), the request command is formed from the command type, the file handle, the command length, and parameters. The command type may show, for example the command types of "Read" or "Write." The file handle is an identifier for specifying a file that is subject to command processing. The file handle is formed by a combination of a GFS-ID that will be described later and a unique ID within that file system. The command length shows the size of the overall command. In the parameters are recorded various types of information according to the command type.

For the parameter type of the request command sent when the client makes a read request to the server, "Read" is specified, and included in the parameters are offset and data size. Specified for the offset is the start address of the part that performs actual reading within a file specified by the file handle. Specified for the data size is the size of the part that performs this reading.

For the parameter type of the request command sent when the client makes a write request to the server, "Write" is specified, and included in the parameters are offset, data size, and user data. Specified for the offset is the start address of the part that performs actual writing within a file specified by the file handle. Specified for the data size is the size of the data for which writing is performed. Stored in the user data is the actual data for which write is performed.

As shown in FIG. 3(b), the response command returned to the client from the server device is formed from the status, the command length, and parameters. The status shows the success or failure of the process executed according to the response command. The command length shows the size of the overall response command. Recorded in the parameters are various types of information according to the type of request command.

In the status of the response command returned when a read request is received from the client, when data read was successful, "OK" is recorded, and when it failed, "NG" is recorded. Recorded in the parameters are the attributes, data size, and user data. In the attributes is recorded permission information for that data. Permission information is information that shows whether that data can be read or write, etc. Recorded in the data size is the side of the read data. Stored in the user data is the actual read data itself.

In the status of the response command returned when a write request is received from a client, when data write was successful, "OK" is recorded, and when it failed, "NG" is recorded. Also, recorded in the parameters is the size of the actually written data.

Note that with this working example, we showed an example about commands relating to data read and write, but in addition to these commands, the storage system 1000 is also able to process a variety of commands such as commands for erasing data and commands for creating a directory, etc.

Figure 4:
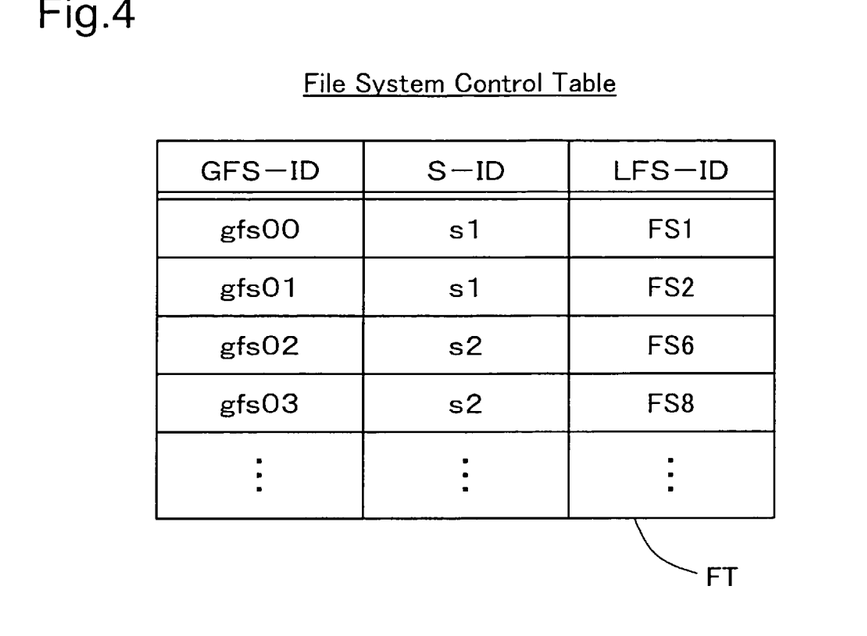
FIG. 4 is an explanatory diagram that shows the structure of the file system control table FT.

FIG. 4 is an explanatory diagram that shows the structure of the file system control table FT that is stored in the local memory 130 of the server device 100. This file system control table FT is a table for comprehensively managing the file system that is managed directly by each of the server devices 100 as well as the file system managed by the other server device 100. A virtual file system ID (GFS-ID), a server ID (S-ID), and a local file system ID (LFS-ID) are correlated and recorded in this file system control table FT.

The virtual file system ID is a virtual file system ID that allows the server device 100 to access the client CL. The server ID is an ID that is uniquely allocated to each of the server devices 100. With this working example, "s1" is allocated as the server ID for the first server device 100a, and "s2" is allocated as the server ID of the second server device 100b. The local file system ID is the ID of the file system directly managed by that server device 100. Each of the server devices 100 is able to determine the server device 100 that is managing that actual file system itself by referencing this file system control table FT if the virtual file system ID is specified from the client CL. This file system control table FT may also hold different contents for each of the server devices 100. In this case, the file system that allows access to the client CL will be different for each of the server devices 100.

Figure 5:
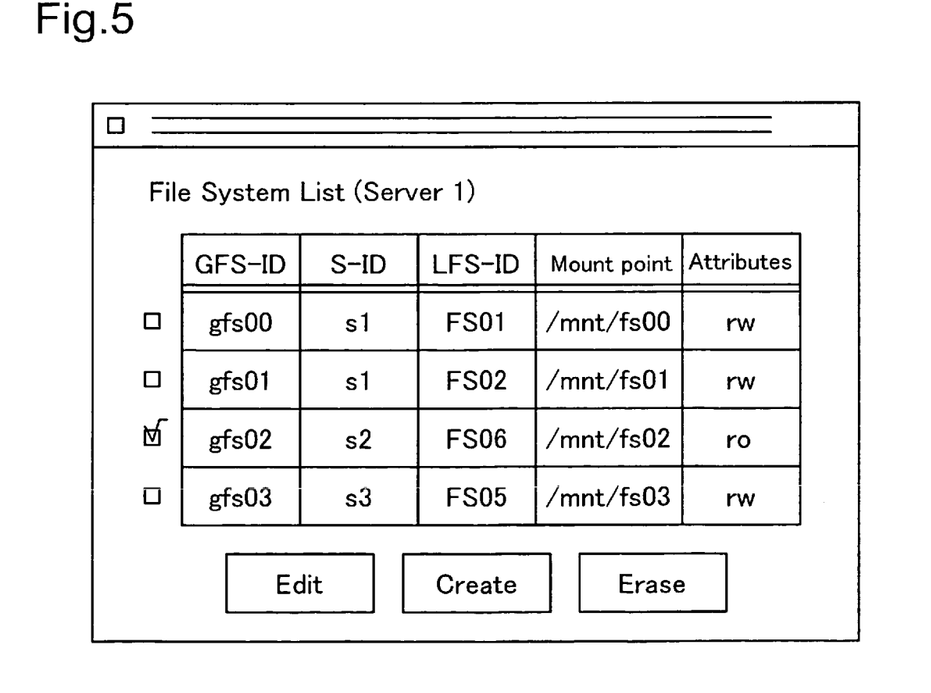
FIG. 5 shows an example of the screen displayed on a management terminal MT.
Figure 6:
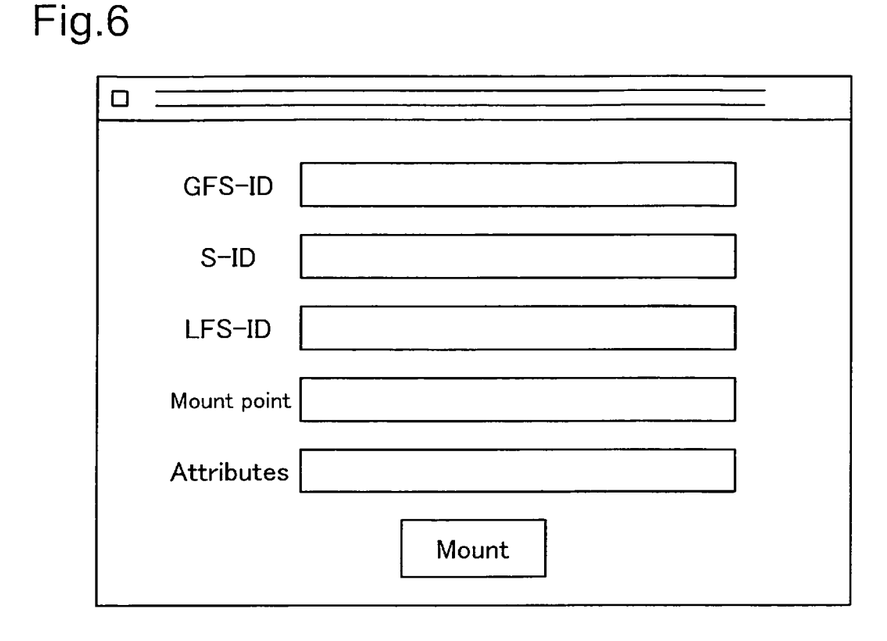
FIG. 6 shows an example of the screen displayed on a management terminal MT.

The file system control table FT may be edited using the management terminal MT connected to the LAN (see FIG. 1). The management table MT is a general use computer, and has installed a program for reading the file system control table FT from the server device 100 and editing it. FIGS. 5 and 6 show examples of screens displayed on the management terminal MT when editing the file system control table FT. As shown in FIG. 5, in the management terminal MT are displayed the GFS-ID, server ID, and LFS-ID as well as the mount point for which that local file system is mounted, and attribute information that shows the permission of that file system, etc. On this screen, when a "Create" button or "Edit" button are pressed, a screen like that shown in FIG. 6 is displayed, and input or editing for each item may be performed. Also, by putting a check mark in the checkbox provided at the left side of the GFS-ID and pressing the "Erase" button, it is possible to unmount that virtual file system.

Figure 7:
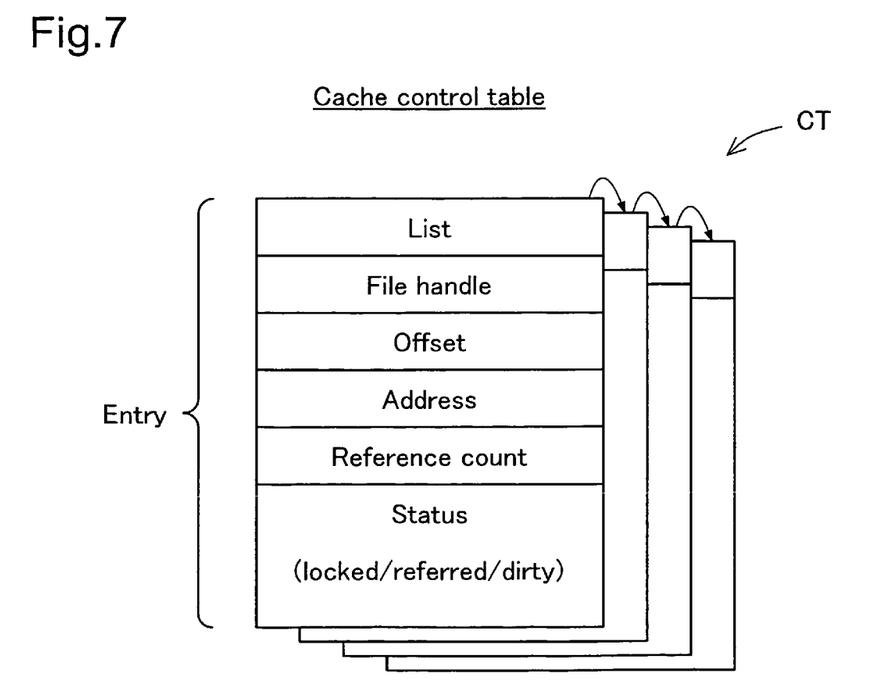
FIG. 7 is an explanatory diagram that shows the structure of the cache control table CT.

FIG. 7 is an explanatory diagram that shows the structure of a cache control table CT that is stored in the local memory 130 of the server device 100. This cache control table CT is a table for managing the cache data that is stored within the shared memory 200. The storage unit of the data that the shared memory 200 has cached is 4 kb, and the cache control table CT has one entry per storage unit. Recorded in each entry are a "List," "File handle," "Offset," "Address," "Reference count," and "Status."

The "List" is management information that becomes the pointer to other entries when performing cache hit determination, etc. The "File handle" is the identifier of the file that is stored in the cache area that is managed by that entry. The "Offset" is the offset address that shows the part within a file that is actually stored in that cache area. The "Address" is the start address of the cache area within the shared memory 200 that is managed by that entry. As described above, because the cache storage unit is 4 kb, normally, in one cache area, only part of a file is stored. Because of this, by using a combination of the "File handle" and "Offset" as well as the "Address," it is possible to manage what part within a file is stored in what cache area. Note that with this working example, we used a combination of the "File handle" and the "Offset," but it is also possible to use a combination of the "inode number" and the "Offset." The "inode number" is a number correlated 1-to-1 with the file handle.

The "Reference count" in an entry is the number of clients that reference that cache area. The "Status" is information that shows the current status of that cache area. In this status, when write to that cache area is prohibited, "locked" is recorded, and when that cache data ahs already been referenced, "referred" is recorded. Also, when that cache data is updated, "dirty" is recorded. This "Reference count" and "Status" are information used when setting whether or not to allow the other server device 100 access to that cache area.

The server device 100 is able to determine whether or not the data for which read and write is performed has already been cached to the shared memory 200 by referencing the cache control table CT formed in this way. Note that when the capacity of the shared memory 200 is used up, the data that is cached in the shared memory 200 is erased in order from the data that has not been used for the longest time.

B. File Access Processing:

Next, we will explain the process of accessing files executed by the storage system 1000 formed as described above based on FIG. 8 and FIG. 9.

Figure 8:
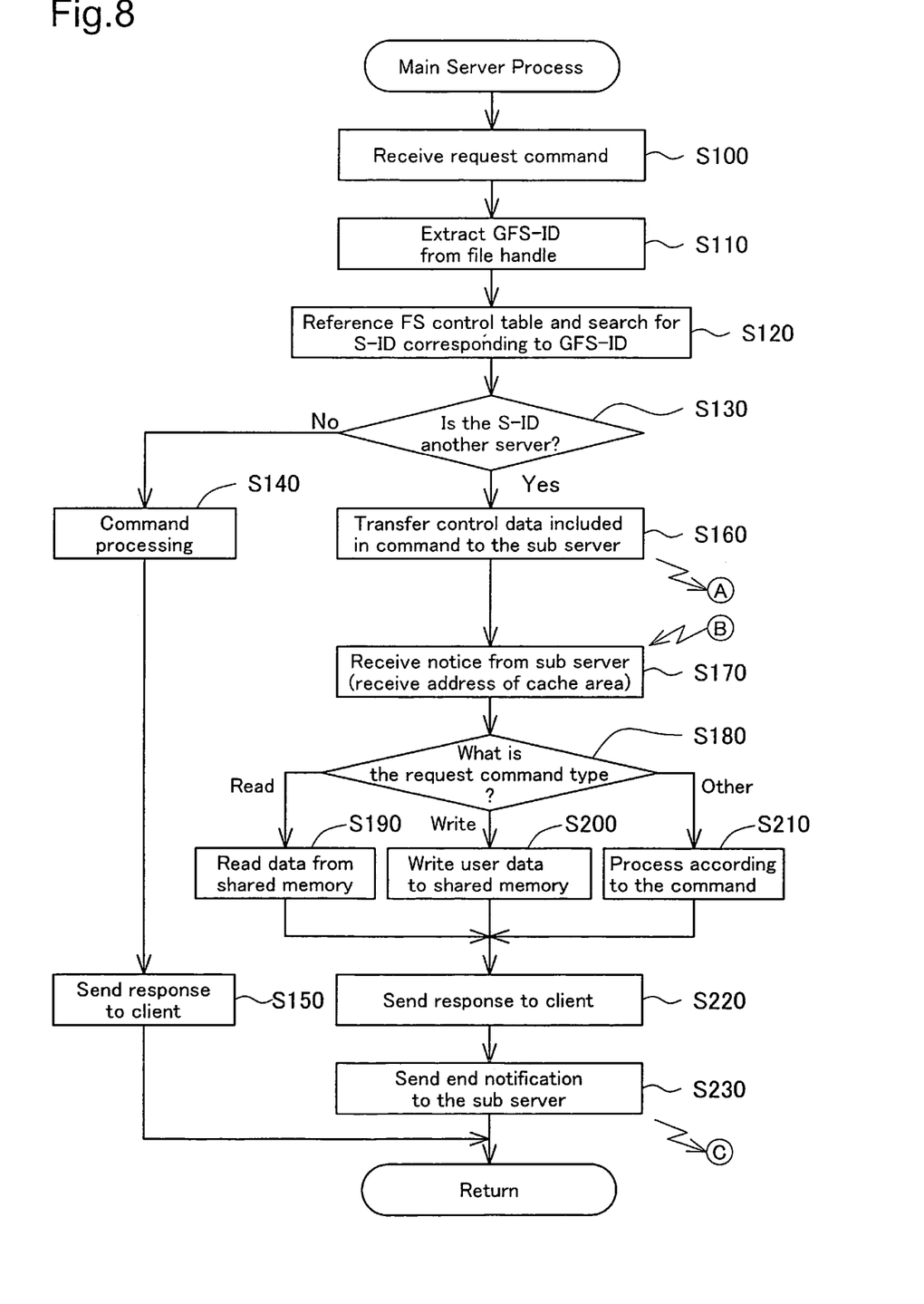
FIG. 8 is a flow chart of the main server process.

FIG. 8 is a flow chart of the main server process that is executed by the server device 100 (hereafter called "main server") that received a request command. First, when the main server receives a request command from the client CL (step S100), it stores that request command once in the local memory 130. In the request command, when the request is a read request, control data is included, and when it is a write request, control data and user data are included (see FIG. 3(a)).

Next, the main server analyzes the contents of the received request command, and determines the server device that is managing the data that is subject to this command process. In specific terms, first, the GFS-ID contained in the file handle that is recorded in the request command is extracted (step S110). For example, if the file handle is "gfs01f001," as the GFS-ID, "gfs01" is extracted. Next, the file system control table FT (see FIG. 4) is referenced, and the server ID that corresponds to this GFS-ID is searched for (step S120). By doing this, it is possible to determine the server device 100 that manages the data that is subject to the processing of the received command.

Next, the main server determines whether or not the found server ID is the server ID of the other server device 100 (step S130). If the determination results are that the server ID is its own server ID (step S130: No), the command process such as read or write is performed according to the received request command (step S140), a response command according to that request command is returned to the client (step S150), and the main server processing ends. The request command temporarily stored in the local memory 130 is erased together with the end of main server processing.

Meanwhile, if the found server ID is the server ID of the other server device 100 (step S130: Yes), the main server transfers the control data part of the request command received from the client to the server device 100 (hereafter called the "sub server") to which that server ID was allocated (step S160). Here, for convenience, we will shift the explanation to FIG. 9.

Figure 9:
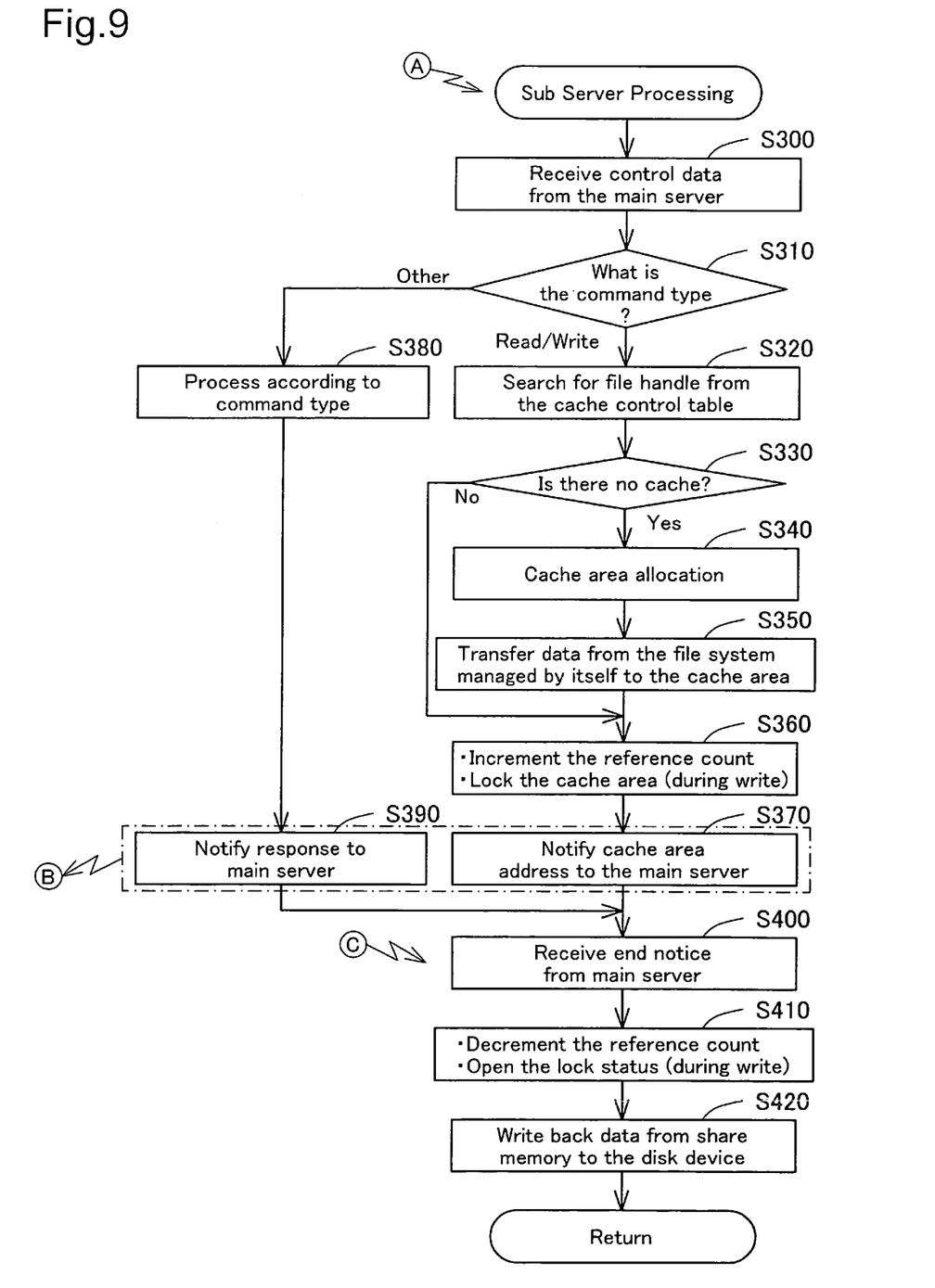
FIG. 9 is a flow chart of the sub server process.

FIG. 9 is a flow chart of the sub server process that is executed when control data is received by the sub server from the main server. When the sub server receives control data from the main server (step S300), it determines the type of command of the received control data (step S310). If the results are that the command is read or write, a search is made for whether or not the file handle and offset specified in the control data are already registered in the cache control table CT (see FIG. 7) (step S320). Using this search, it is possible to determine whether or not the file that is subject to read or write has already been cached in the shared memory.

If the search results are judged to show that the file that is subject to read and write is not cached (step S330: Yes), then a new cache area is secured for storing this file within the shared memory 200 (step S340). Also, information relating to this new cache area is registered in the cache control table CT. Then, as necessary, part of the file specified by the control data is read from its own managed file system and transferred to this cache area (step S350). As a result of the search using step S320 noted above, when the file that is subject to read and write is determined to already be cached in the shared memory 200, the processes of the step S340 and S350 noted above are omitted.

Next, the sub server increments the number of references in the cache control table CT. At this time, when the command type of the control data is "Write," that cache area is locked so that write is not performed on cached data from a server device other than the main server (step S360). Then, the sub server notifies the address of the cache area to the main server (step S370). Note that for the step S310 noted above, when the command type is determined not to be read or write, then processing is performed according to that command type (step S380), and notice is given to the main server to the effect that that process is completed (step S390).

We will return to FIG. 9 for our explanation. When the main server receives notification from the sub server (step S170), it determines the command type of the request command received from the client CL (step S180). Then, when the type is "Read," the address of the cache area notified from the sub server is referenced, and the data from the cache area inside the shared memory 200 is read (step S190). When it is "Write," the user data included in the request command is written to the cache area address notified from the sub server, and the data stored in the shared memory is updated (step S200). If the command type is not "Read" or "Write," processing is performed according to that command (step S210).

Next, the main user returns a response command according to the command type of the request command to the client (step S220). When the command type is "Read," the data read from the shared memory with the step S190 noted above is returned to the client. Also, when it is "Write," information of whether or not write succeeded is returned to the client. When the main server returns a response command to the client in this way, it sends an end notice to the effect that processing has ended to the sub server (step S230), and the main server processing ends. Note that with the step S190 and step S220 noted above, for the read command process, we had the main server read data from the shared memory 200 and returns this to the client, but it is also possible to return data directly to the client from the shared memory 200 without going through the main server.

We will again shift the explanation to FIG. 9. When the sub server receives an end notice from the main server (step S400), and when the command type is "Read" and "Write," the reference count that was incremented with step S360 noted above is decremented. Also, when the command type is "Write," the lock status of the cache area that was locked with the step S360 noted above is unlocked (step S410). When the command type is other than "Read" or "Write," end processing is performed according to that command type.

Finally, when the command type is "Write," at the step S200 of FIG. 8, the sub server writes and returns the data written to the shared memory 200 by the main server to the file system controlled by itself as necessary (step S390), and the sub server processing ends.

Note that we omitted the details of the process for the step S140 (FIG. 8) of the main server process described above, but with this step, processes that correlate to the process of the steps S310 to S360 of the sub server process, the process for steps S180 to S210 of the main server process, and the process of the steps S410 to S420 of the sub server process are executed.

With the storage system 1000 of this working example constructed as noted above, each of the server devices 100 open to each client CL a virtual file system that includes the file system managed by the other server device 100. Because of this, client CL is able to access the desired file system using any server device 100 without being aware of which file system is managed by which server device 100.

Also, when a server device 100 of this working example transfers a command to the other server device 100, it transfers only the control data part, and the user data part is exchanged via the shared memory. Because of this, the size of the data that is directly transferred between the server devices 100 is reduced, the load on the CPU of the server device 100 decreases, and this inhibits delay in response to the client CL. As a result, it is possible to attempt an improvement in the performance of the overall storage system.

Above, we explained a working example of the present invention, but the present invention is not limited in any way to this kind of working example, and it is of course possible to obtain a variety of embodiments within a scope that does not stray from the key points of the present invention.

For example, with the working embodiment noted above, we had the shared memory 200 formed using non-volatile memory, but in contrast to this, it is also possible to form this using volatile memory. In this case, after confirming that the data that the main server wrote to the shared memory 200 was written reliably to the disk device 400 by the sub server, to have a response command returned to the client, it is preferable that the main server perform the processing of the step S220 of FIG. 8 after receiving notice from the sub server to the effect that the process of the step S240 of FIG. 9 is completed.

It is also possible to have the storage system 1000 formed without comprising a shared memory 200. In this case, each of the server devices 100 comprises a respective shared memory area within the local memory 130, and this can hold a memory map for which each respective shared memory area is mutually mapped. With this kind of structure, it is possible to simplify the system structure.

It is also possible to have it each of the server devices 100 be able to dynamically change the file system that is manages. By working in this way, for example, when the load of the first server device 100a increases, it is possible to perform a control of allocating the management of part of the file system managed by this first server device 100a to the second server device 100b. The control of allocating the file system subject to management may be performed with mutual load observation by each of the server devices 100, or by having the management terminal MT monitor the load of each of the server devices 100. With this kind of structure, it is possible to further improve the processing capability of the storage system.

Having described a preferred embodiment of the invention with reference to the accompanying drawings, it is to be understood that the invention is not limited to the embodiments and that various changes and modifications could be effected therein by one skilled in the art without departing from the spirit or scope of the invention as defined in the appended claims.

What is claimed is:

1. A storage system coupled to at least one client, the storage system comprising:
   a storage device that stores data used by said client;
   first and second file server devices coupled together via a network, wherein the first file server device is coupled to said client, each file server device exclusively managing at least part of the data stored in said storage device, the data being organized as one or more file systems, each file server device accessing the data at the file system level; and
   a shared memory that is used in common by each of said file server devices,
   wherein said first file server device comprises:
   a determination unit that, when a write command is received from said client, determines whether said second file server device manages the data that is subject to the processing of the write command; and
   a data processing unit that, when said second file server device manages the data that is subject to the processing of the write command, transfers control data contained in the write command to said second file server device,
   wherein said second file server device reads data specified by the control data from said storage device and transfers the data to an address of a storage area specified within said shared memory, said first file server device specifying the address of said shared memory to which said second file server device transfers the data,
   wherein said first file server device updates the data transferred to said shared memory using write data included in the write command,
   wherein said second file server device transfers the updated data from said shared memory to said storage device, and
   wherein said first file server device sends a response to said client when processing of the data according to the write command is complete.

2. The storage system in accordance with claim 1, wherein:
   each of said file server devices further comprises a shared memory transfer unit, wherein the shared memory transfer unit of the second file server device reads the data specified by the control data from said storage device and transfers the data to the shared memory.

3. The storage system in accordance with claim 1 or 2, wherein:
   said data processing unit comprises an update processing unit, wherein said data processing unit of said first file server device updates the data transferred to said shared memory by using data contained in the write command.

4. The storage system in accordance with claim 3, wherein:
   said each file server device further comprises a write processing unit, wherein said write processing unit of said second file server device writes the updated data back to said storage device.

5. The storage system in accordance with claim 1, wherein:
   said data processing unit of said each file server device comprises a read processing unit, wherein said read processing unit of said first file server device outputs the data transferred to said shared memory to said client.

6. The storage system in accordance with claim 1, wherein:
   said determination unit of said first file server device determines whether said second file server device manages the data that is subject to the processing of the write command based on a management table in which is defined a correlation between each of said file server devices and a file system within said storage device that is uniquely managed by each of said file server devices, said determination unit correlating an identifier in the write command to a corresponding file server device identifier to determine whether said second file server device manages the data that is subject to the processing of the write command.

7. The storage system in accordance with claim 6, further comprising:
   a management device for performing setting of said management tables for each of said file server devices.

8. The storage system in accordance with claim 1, wherein:
   each of said file server devices has a memory map that is mapped by an address system for which an address of a storage area within a local memory and the address of the storage area specified within said shared memory are in common, and comprise a means of accessing said shared memory using said memory map.

9. The storage system in accordance with claim 1, wherein said shared memory is non-volatile memory for which the power supply is backed up.

10. A first file server device that is configured as part of a storage system that comprises a shared memory used in common with a second file server device coupled to said first file server device via network and exclusively manages at least part of a file system stored in a storage device together with said second file server device, said first file server device comprising:
    a determination unit that, when a write command is received from a client coupled to the first file server device, determines whether said second file server device manages the data that is subject to the processing of the write command by analyzing the contents of the write command; and
    a data processing unit that:
    when said second file server device manages the data that is subject to the processing of the write command, transfers control data included in the write command to said second file server device, and
    when data specified by the control data is read from said storage device and is transferred to an address specified in said shared memory by said second file server device:
    said data processing unit of said first file server device updates the data transferred to said shared memory using write data included in the write command,
    said second file server device transfers the updated data from said shared memory to said storage device, and
    said first file server device sends a response to said client when processing of the data according to the write command is complete,
    wherein said first file server device specifies the address of said shared memory to which said second file server device transfers the data.

11. A data managing method that manages data input and output using shared memory shared by first and second file server devices that each exclusively manages at least part of the data stored in a storage device, said first and second file server devices being coupled together via a network, said first file server device being coupled to a client, the method comprising the steps of:
    determining whether said second file server device manages the data that is subject to the processing of a write command when the write command is received by said first file server device from said client, wherein the determining is performed by analyzing the contents of the write command;
    when said second file server device manages the data that is subject to the processing of a write command, transferring from said first file server device control data contained in the write command to said second file server device, said first file server device subsequently updating the data transferred to an address specified in said shared memory using write data included in the write command when data specified by the control data is read from said storage device and is transferred to said shared memory by said second file server device, wherein said first file server device specifies the address in said shared memory to which said second file server device transfers the data;

transferring the updated data from said shared memory to said storage device; and sending a response to said client when processing of the data according to the write command is complete.

12. A computer program product that manages data input and output using shared memory shared by first and second file server devices that each exclusively manages at least part of the data stored in a storage device, said first and second file server devices being coupled together via a network, said first file server device being coupled to a client, said computer program product comprising a recording medium and a program code recorded therein, wherein said program code comprises:

a first program code that, when a write command is received by said first file server device from said client, by analyzing the contents of the write command, determines whether said second file server device manages data that is subject to the processing of the write command;

a second program code that:

when the second server device manages data that is subject to the processing of the write command, transfers control data contained in the write command to said second file server device, and when the data specified by the control data is read from the storage device and is transferred to an address specified in the shared memory by said second file server device, said first file server device updates the data transferred to said shared memory using write data included in the write command, wherein said first file server device specifies the address in said shared memory to which said second file server device transfers the data;

a third program code that transfers the updated data from said shared memory to said storage device; and a fourth program code that sends a response to said client when processing of the data according to the write command is complete.

* * * * *